United States Patent [19]

Ducharme

[11] Patent Number: 4,490,064
[45] Date of Patent: Dec. 25, 1984

[54] JOINT FOR MODULAR FRAME CONSTRUCTION

[76] Inventor: Jacques Ducharme, 5410, 2nd Ave., Rosemont, Montreal, Canada, H1Y 2Y3

[21] Appl. No.: 389,984

[22] Filed: Jun. 18, 1982

[51] Int. Cl.³ .......................................... F16B 12/32
[52] U.S. Cl. .................................. 403/255; 403/254; 403/252; 403/292; 403/298; 403/264; 403/362; 411/188
[58] Field of Search .............. 403/255, 254, 252, 231, 403/219, 257, 264, 236, 298, 359, 292, 295, 187, 189, 199, 362; 411/452, 424, 180, 188, 187; 256/69, 65; 312/111, 140, 257

[56] References Cited

U.S. PATENT DOCUMENTS

| 569,235 | 10/1896 | Rockwell | 403/298 X |
| 1,318,315 | 10/1919 | Edwards | 411/452 X |
| 2,691,538 | 9/1954 | Clausen | 403/375 X |
| 2,970,025 | 1/1961 | Wilson | 403/219 |
| 3,017,657 | 1/1962 | Mills | 403/362 X |
| 3,186,561 | 6/1965 | Strassle . | |
| 3,250,584 | 5/1966 | Tassell . | |
| 3,458,052 | 7/1969 | Kann . | |
| 3,513,606 | 5/1970 | Jones . | |
| 3,525,560 | 8/1970 | Gasner et al. . | |
| 3,574,367 | 4/1971 | Jankowski . | |
| 3,661,434 | 5/1972 | Alster . | |
| 3,785,420 | 1/1974 | Bradley et al. | 411/188 |
| 3,816,011 | 6/1974 | Biebuyck et al. . | |
| 3,901,612 | 8/1975 | Canin | 403/264 X |
| 4,017,199 | 4/1977 | Strassle | 403/264 |
| 4,126,364 | 11/1978 | Reilly | 312/140 |

FOREIGN PATENT DOCUMENTS

| 1015523 | 1/1912 | Canada . | |
| 725350 | 1/1966 | Canada . | |
| 835257 | 2/1970 | Canada . | |
| 971333 | 7/1975 | Canada . | |
| 998819 | 10/1976 | Canada . | |
| 1086369 | 9/1980 | Canada . | |
| 3047642 | 10/1982 | Fed. Rep. of Germany . | |
| 2387370 | 12/1978 | France | 403/264 |

Primary Examiner—Cornelius J. Husar
Assistant Examiner—Joseph A. Fischetti

[57] ABSTRACT

A joint of the type made between two elongated frame members and including also a connector member releasably coupling the two frame members tightly one against the other. This joint is characterized by its exclusion of special machining and construction of the components, by the connector member being unconspicuously concealed and by the possibility of assembling one frame member in any angular relationship about its longitudinal axis relative to the other frame member.

1 Claim, 7 Drawing Figures

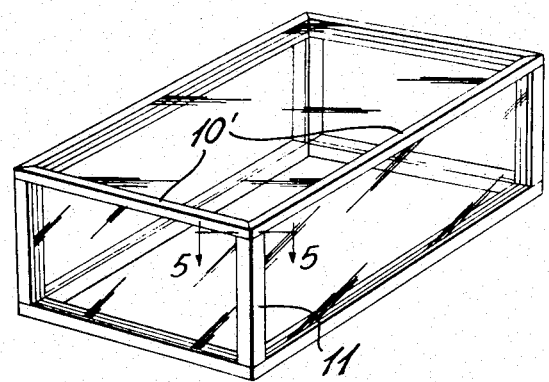
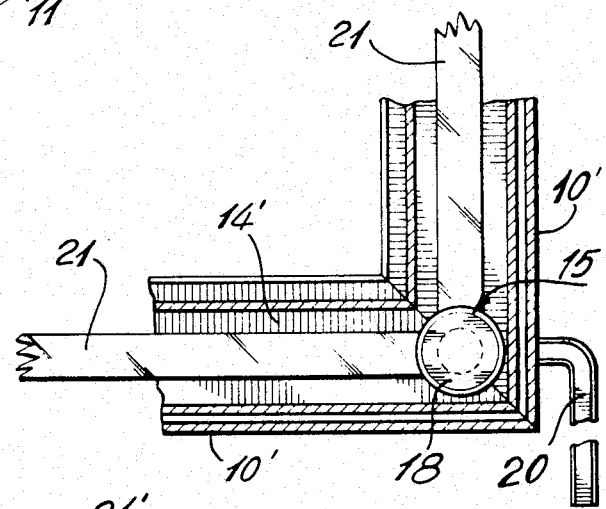
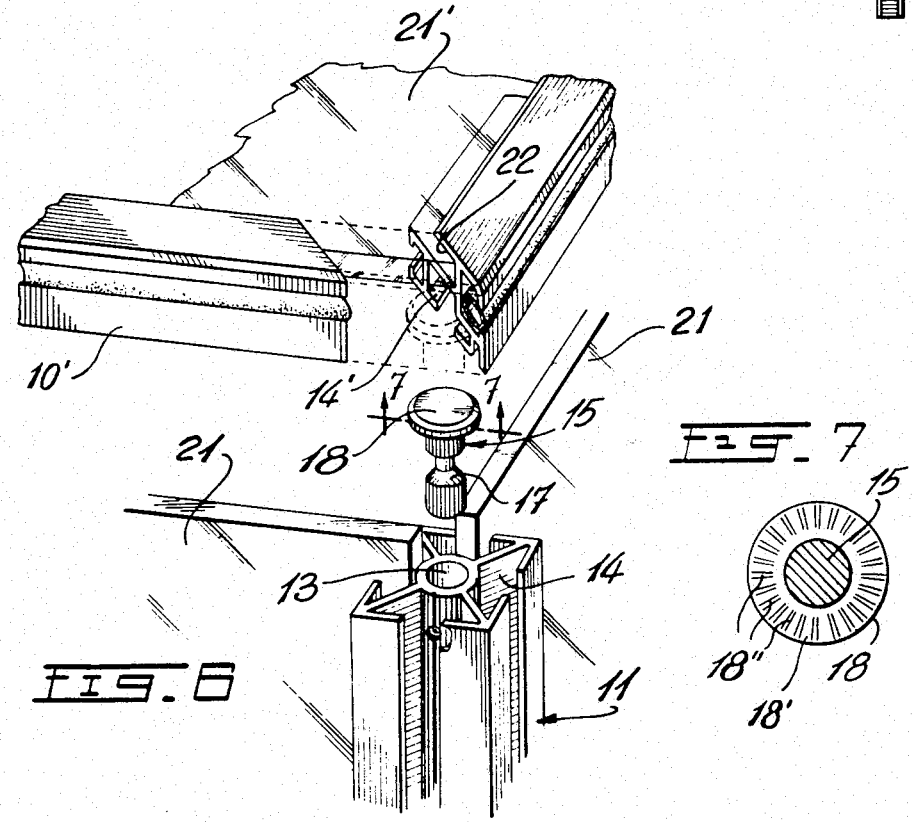

JOINT FOR MODULAR FRAME CONSTRUCTION

FIELD OF THE INVENTION

This invention relates to a modular construction formed with frame members and, in particular, to a releasable joint of the type formed with such frame members.

DESCRIPTION OF THE PRIOR ART

Modular constructions of the kind involved here are conventionally made using extruded frame members grooved to be interconnected with panels to form bookcases, showcases, display counters, tables, etc. In the joints that have been used and/or proposed to interconnect such frame members, either a frame member or a connector has to be specially machined at the factory or shop. Such machining and special construction result in added costs. Besides, such previously-known joints are either conspicuous or can be assembled with frame members arranged in only one or two angular relationship relative one with another.

OBJECTS OF THE INVENTION

It is a general object of the present invention to provide a releasable joint for modular frame construction that is constructed and arranged to avoid the above-mentioned disadvantages.

It is a more specific object of the present invention to provide a releasable joint for modular frame construction that is made with a minimum of special construction and machining.

It is another object of the present invention to provide a releasable joint for modular frame construction that is unconspicuous and even totally concealable by regular trim in the external slots of the frame members.

It is a further object of the present invention to provide a releasable joint for modular frame construction, wherein one frame member may be joined endwise to another in any angular relationship around its longitudinal axis relative to the other frame member.

SUMMARY OF THE INVENTION

The releasable joint of the invention comprises a pair of frame members each having an end portion defining an end face and each having a surrounding lateral surface, one of the frame members including a plurality of lateral faces cooperatively forming the surrounding lateral surface, and coupling T shape slots extending in said lateral faces, the other of the frame members having a cylindrical bore inwardly extending in the corresponding end face, a connector member made of a harder material than said frame members and having a longitudinally serrated cylindrical portion slidably engaging in said bore, an outwardly-projecting enlarged head lockingly engaging into one of the coupling T shape slots, said head having an inner contact face which is radially serrated, said cylindrical portion having a groove circumferentially formed around the same intermediate the ends thereof, and defining a camming radially inclined surface opposite said head, and a screw threaded transversely in said end portion, having an inner end engaging the camming surface, and operatively urging the enlarged head to press said one frame member laterally against the end face of said other frame member upon tightening of the screw, said knurled cylindrical portion and knurled inner contact face of said head preventing relative rotation of said two frame members about the axis of said bore.

BRIEF DESCRIPTION OF THE INVENTION

The above and other objects and advantages of the present invention will be better understood with reference to the following detailed description of preferred embodiments thereof which are illustrated, by way of examples, in the accompanying drawings, in which:

FIG. 4 is a perspective view of part of a display counter incorporating another embodiment of the joint of the present invention;

FIG. 5 is a section taken along line 5—5 of FIG. 4;

FIG. 6 is an exploded perspective view of the joint of FIG. 4; and

FIG. 7 is a section of the connector taken along line 7—7 of FIG. 6.

DETAILED DESCRIPTION OF PREFERRED EMBODIMENTS

Figure 1:
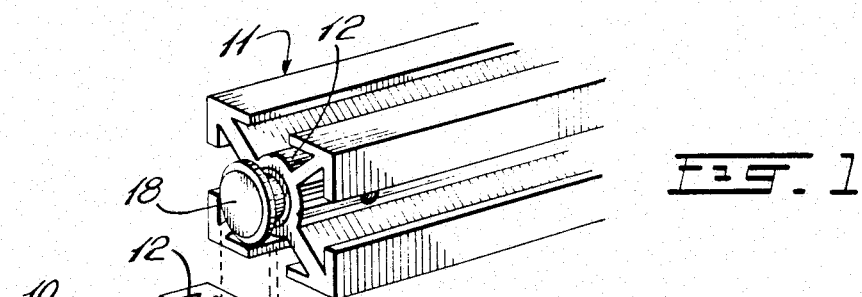
FIG. 1 is a perspective view of a joint according to the present invention before interconnection of its pair of frame members.
Figure 2:
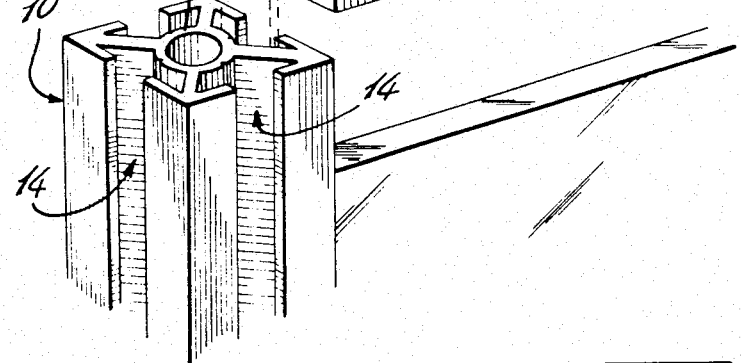
FIGS. 2 and 3 are similar cross-sectional views of the joint of FIG. 1 respectively before and after tightening of the frame members one against the other.
Figure 3:
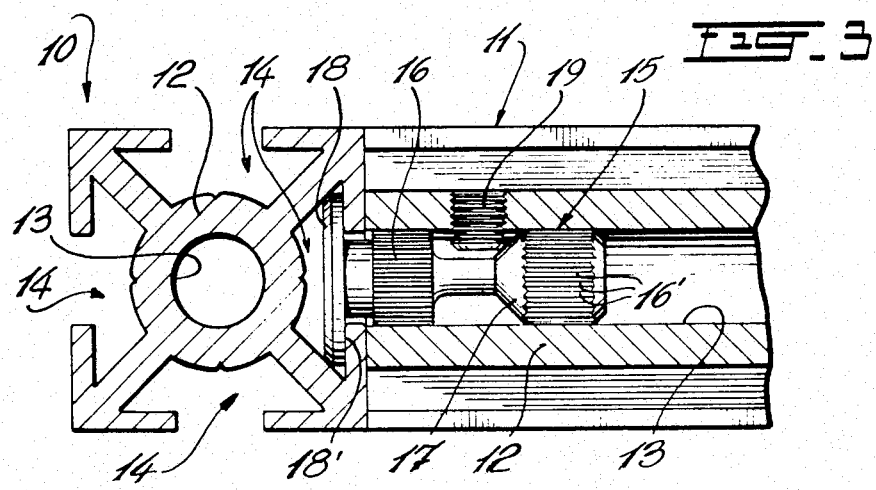

The illustrated releasable joint comprises two elongated frame members 10, 11, each in the form of an extruded bar of aluminum or other appropriate material. Each bar 10, 11 includes a central tubular portion 12 defining a central cylindrical bore 13. Each frame member or bar 10, 11 is of square cross-sectional outline defining a surrounding lateral surface formed by four lateral external flat faces. In each of those faces, there is formed a longitudinal slot, at 14, of generally T-shaped cross-section. Slot 14 defines a channel 14a opening at the external face of bar 10 and a chamber 14b which is wider than channel 14a and which defines internal face portions 14c on each side of channel 14a.

The joint also includes a connector member 15, made of a harder material than frame members 10, 11 and having a major cylindrical portion 16 slidable endwise in one end of the bore 13 and is longitudinally serrated, as shown serrations 16', for a purpose to be explained hereinafter. The major portion 16 is provided with a groove circumferentially formed around it and intermediate its ends. That groove forms a camming surface 17. The connector member 15 also includes an enlarged head 18 outwardly projecting to slidably engage in a T shape slot 14 formed in the face of a frame member 10 against which the frame member 11 holding the connector member is engaged endwise. As shown in FIG. 7, inner contact face 18' of head 18 has radial serrations 18'', for a purpose to be explained later. Camming surface 17 is radially inwardly inclined towards head 18. A set screw 19 is threaded transversely through the corresponding end of the tubular portion 12 of frame member 11 inside a T shape slot. The set screw 19 is constructed and arranged to engage the camming surface 17 to inwardly urge the connector member by screwing of the set screw 19. This causes the enlarged head 18 to pull the frame member 10 tightly against the end of the frame member 11. Preferably, connector member 15 is made of a material, such as steel, which is hard enough so that camming surface 17 will not be grooved by set screw 19.

The serrations 18'' on the inner contact face 18' of head 18 dig into the metal of frame member 10 and prevent relative rotation of the latter and of connector 15. Serrations 18" also positively prevent movement of head 18 in slot 14 of frame member 10.

Transverse pressure exerted by set screw 19 of connector 15 causes serrations 16' to dig into the metal of member 11 at the surface portion of bore 13 opposite set screw 19. Therefore, relative rotation of connector 15 and member 11 is prevented. It follows that members 10 and 11 are positively prevented from relative rotation about the axis of bore 18, or member 11, and member 11 cannot slide along member 10. FIGS. 4 to 6 show an application of the system where three members are joined by a common connector.

A releasable joint may be made with three frame members 10', 10', and 11 joined together by a single connector member 15. Members 10', 10' may have a cross-sectional shape that differs from that of member 11, but have T-shape slots 14' as in member 10. The joint is obtained by abutting a pair of frame members 10' endwise one with another and by placing the other frame member 11, such that the enlarged head 18 of the corresponding connector member engages at the seam between the abutting frame members 10', 10' in the two T shape slots 14' that meet there.

When the two abutting members 10', 10' are cut at right angles at their butting ends, the assembly of the three members form a T in one plane. When the two abutting members 10', 10' are cut at a 45° degree angle at their butting ends, the three members 10', 10', 11 extend in two perpendicular planes and are perpendicular to one another.

The display counter of FIG. 4 includes a framework formed of upright members 11 and horizontal members 10' cut at 45° at their butting end. A key 20 may be used to tighten set screw 19. Glass panes 21 are retained in T slots 14' of members 10', and in slots 14 of members 11 and a top glass pane 21' is retained in slots 22 of members 10'.

It must be noted that, once the joint is assembled, only the set screw 19 could be seen but is readily concealable by the ordinary trim that is placed in the T shape slot to close it.

What I claim is:

1. A releasable joint for modular frame construction comprising a first and a second elongated frame member and a connector member for releasably securing said two frame members together, each frame member having a T-shaped slot extending longitudinally of the same and defined by a channel opening at an external face of said frame member and by an inner chamber wider than said channel and defining internal face portions of each side of said channel, said first frame member having a transverse and flat end face, and further including a central tubular portion defining a cylindrical bore extending longitudinally of said first frame member and opening at said end face, said connector member made of a harder material than that of said frame members, and having a cylindrical portion which has longitudinal serrations and which slidably engages within said bore of said frame member, said connector member further having at one end of said cylindrical portion an outwardly-projecting enlarged head engaging into the T-shaped slot of said second frame member, said head having an inner contact face which has radial serrations and which faces said internal face portions of said second frame member, said cylindrical portion having a groove circumferentially formed around the same intermediate the ends thereof and defining opposite said head a camming surface which is radially inwardly inclined towards said head, and a screw threaded transversely in said tubular portion of said first frame member, having an outer end accessible through said T-shaped slot and having an inner end engaging said camming surface; tightening of said screw both axially and laterally displacing said cylindrical portion within said bore to cause the radial serrations of said head to dig into said internal face portion and press said second frame member laterally against the flat end face of said first member and to cause those longitudinal serrations of said cylindrical portion which are opposite to said screw to dig into said tubular portion, whereby relative rotation of said two frame members about the axis of the bore of said first frame member is prevented and said radial serrations also prevent movement of said head along the T-shaped slot of said second frame member.

* * * * *